Feb. 8, 1955  B. BARÉNYI  2,701,726
VEHICLE FRAME, ESPECIALLY FOR MOTOR VEHICLES
Filed Dec. 3, 1949
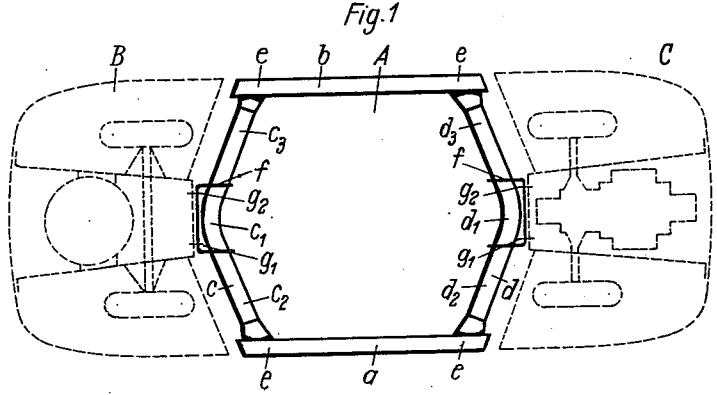
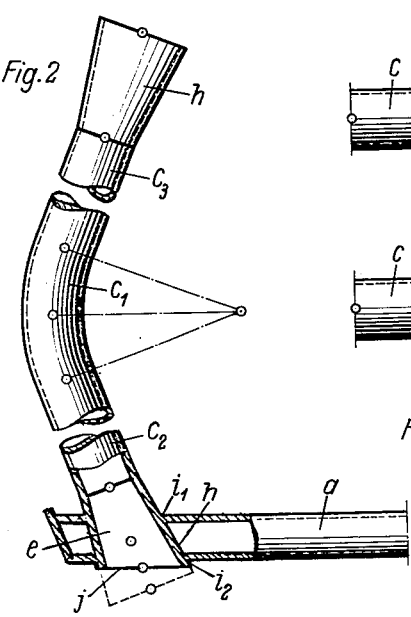
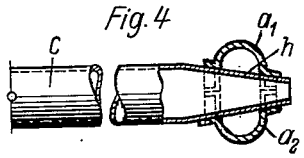
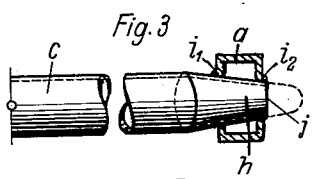
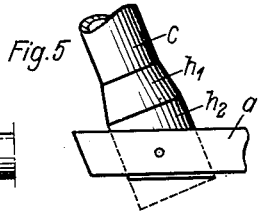
INVENTOR
BÉLA BARÉNYI
By Haseltine, Lake & Co.
AGENTS

United States Patent Office 2,701,726
Patented Feb. 8, 1955

2,701,726

VEHICLE FRAME, ESPECIALLY FOR MOTOR VEHICLES

Béla Barényi, Stuttgart, Germany, assignor to Daimler-Benz Aktiengesellschaft, Stuttgart-Unterturkheim, Germany Application December 3, 1949, Serial No. 130,988

Claims priority, application Germany December 7, 1948

5 Claims. (Cl. 280—106)

This invention relates to a frame for vehicles, especially motor vehicles, having longitudinal and transversal girders. Among other objects it aims to develop the frame so as to be particularly adapted to receive power forces, moreover to obtain such a shape of the frame which will warrant an interior space of the vehicle body as unencumbered and ample as possible. A further object of the invention is to facilitate and to cheapen the manufacture of the frame.

Consequently an essential feature of the invention consists in that the transversal girder (eventually being several) is bent arrow-like in such a way that a central curvature is followed by an essentially rectilinear portion extending as far as the longitudinal frame girders, which preferably have a mutual distance exceeding that of the wheel gauge. More particularly the invention relates to such frames, in which the central portion of the vehicle frame is formed by a front transversal girder and a rear transversal girder both bent arrow-like so as to create an annular frame, more particularly being essentially hexagonal, which will limit especially the interior space of the body and is suitably free from any cross girders.

A transversal girder formed arrow-like according to the invention is most easily to be manufactured, more easily e. g. than a transversal girder bent continually. Moreover a frame having transversal girders of such a shape permits of easier construction of a vehicle body adapted to such transversal girders and of a particularly convenient transmission of the forces acting on the bent portion of said transversal girders, seeing that the rectilinear tracing of the transversal girders starting from the central portion towards the longitudinal girders will prevent additional eccentric bending produced by transversal or axial forces. Furthermore there is obtained a frame limiting the vehicle's interior space most suitably and spaciously, having at the same time considerable stiffness. A further feature of the invention consists in that the ends of the transversal girders preferably conducted obliquely through the longitudinal girders and e. g. welded to that latter—the longitudinal as well as the transversal girders being suitably of a tube-like or chest-like profile—are compressed to a lower cross section, broadened in the direction of the longitudinal girders' axis. Thereby the following advantages are obtained: the cross section of the longitudinal girders or their inertia moment with relation to bending stresses is less weakened. At the same time, which is most important for vehicles manufactured after the cell system, the forces acting in the vehicle's longitudinal direction on the transversal girder (e. g. the forces of driving and braking) are transmitted to the longitudinal girders under a particularly favourable stress produced on the transversal girder's cross section. Simultaneously the welding seams eventually conducted obliquely with relation to the transversal girder's axis will warrant a connection particularly stiff and strong. By a conical shape of the ends of the transversal girders traversing said longitudinal girders the transmission of forces may be rendered still more favourable and reliable as to the strength of connection of the longitudinal and transversal girder.

Other features and particulars may be gathered from the following description of an embodiment of the invention. The accompanying drawing shows In Fig. 1 the plan view of a vehicle having a frame constructed according to the invention, In Fig. 2 a transversal girder and its connection to a longitudinal girder on an enlarged scale, In Fig. 3 a part view of the transversal girder and the longitudinal girder according to Fig. 2 as seen from the front, In Fig. 4 a view corresponding to Fig. 3 but relating to a somewhat different embodiment, and In Fig. 5 a plan view corresponding to Fig. 2 but relating to a further constructional example of the transversal girder and its connection to the longitudinal girder.

The vehicle corresponding to Fig. 1 and eventually manufactured according to the cell system consists of the central part A and the two vehicle end parts B and C. The vehicle end part B e. g. carries the front axle aggregate, while the vehicle end part C carries the rear axle aggregate as well as the motor drive aggregate.

The frame of the central part is made up of the two longitudinal girders $a$ and $b$ and the two transversal girders $c$ and $d$, said transversal girders being bent towards the vehicle ends and having a central curvature $c1$, $d1$ and rectilinear end parts $c2$, $c3$ and $d2$, $d3$ respectively, which end parts are connected on the crossing spots $e$ to the longitudinal girders e. g. by welding. Thus will result a frame essentially hexagonal, the breadth of which e. g. corresponds to the maximum breadth of the vehicle, such frame being adapted to limit in a most suitable way the whole interior space of the vehicle body. By way of example the longitudinal girders $a$ and $b$ are disposed below the doors, the transversal girder $c$ on the dash board or front wall, the transversal girder $d$ on the rear wall behind the rear seats. Within the hexagon space suitably no frame girders are provided, but a continuous floor. For connecting the vehicle end parts B and C the transversal girders are provided with stiffening members $f$, to which the vehicle end parts are secured on $g1$ and $g2$ (e. g. by means of screws), said stiffening members including the bent parts $c1$ and $d1$ respectively of the transversal girders.

While the cross section of the longitudinal girders is box-shaped, the transversal girders are of a uniform tubular cross section with the exception of their ends conducted through the longitudinal girders.

The ends $h$ of the transversal girders are compressed in such a way, e. g. conically, that the height of their cross section (see Fig. 3) is smaller and the breadth of same is larger than the remaining cross section of the tubular transversal girders, the transversal girder thus being connected, as seen in the horizontal plane, to the longitudinal girder the cross-section of which has a greater vertical than horizontal dimension, which will help to receive in a most suitable manner such forces as are transmitted in the longitudinal direction of the vehicle from the transversal girder to the longitudinal girder (e. g. the driving and braking forces transmitted on $g1$ and $g2$ to the transversal girder). The oblique connection of the transversal girder and the welding seams $i1$ and $i2$ extending obliquely to said girder and thereby enlarged will also help to this effect together with the conical support of said transversal girder within said longitudinal girder. Moreover the latter is less weakened on account of the transversal girder's cross-section being lessened on the crossing spot.

The ends of the transversal girders may somewhat project beyond the longitudinal girders or they may essentially come to an end on the outer surface of the latter, particularly when the longitudinal girders are disposed at such a distance as will correspond to the vehicle's breadth. By this reason the ends of the transversal girders are suitably cut on $j$ in parallelism to the longitudinal girder immediately adjacent to the outer welding seam $i2$.

To conduct the transversal girder thus constructed through the longitudinal girder, the latter, as is shown e. g. in Fig. 4, may be formed of the two parts $a1$ and $a2$. The halves $a1$, $a2$ when built together may be connected by means of flanges or, which is more advisable, welded both together and to the transversal girder.

Another method of connection is shown in Fig. 5. In this case the conical compression of the transversal girder is formed at a spot $h1$, which is not inserted into the longitudinal girder $a$, while the portion $h2$ conducted through the longitudinal girder is itself cylindrically shaped, but of oval cross-section. The longitudinal girder in this case may be manufactured undivided.

The frame may be constructed as an independent frame or as a frame of a self-carrying vehicle body.

This invention is not restricted to the constructional example as illustrated, but may be anyhow varied within the scope of the features as claimed.

What I claim is:

1. In a motor vehicle, a frame comprising wheels defining a wheel track, said wheels including a front pair of wheels and a rear pair of wheels, said front and rear pairs of wheels defining a wheel base, two longitudinal frame girders lying outside the wheel track and two transverse frame girders connected thereto and located between the front pair of wheels and the rear pair of wheels inside the wheel base, at least one of said transverse girders having two substantially straight integral sections forming an obtuse angle the apex of which is located within the central longitudinal plane of the vehicle and points towards the adjacent end thereof, a central section connecting said straight sections with one another, said straight sections being extended laterally away from the said central section and secured to the longitudinal frame girders, in combination with means for connecting a vehicle end part of the central section of each of said transverse frame girders whereby thrusts emanating within the end parts are transferred to said frame within the region of the central section substantially at the apex of said angle.

2. In a motor vehicle, a frame comprising wheels defining a wheel track, said wheels including a front pair of wheels and a rear pair of wheels, said front and rear pairs of wheels defining a wheel base, two longitudinal frame girders lying outside the wheel track, and two transverse frame girders connected thereto and located between the front pair of wheels and the rear pair of wheels inside the wheel base, at least one of said transverse girders having a central curved section and two lateral straight sections integral therewith and forming an obtuse angle, said central curved section being located within the central longitudinal plane of the vehicle and the apex of said angle pointing towards the adjacent end of the vehicle, said straight sections being extended laterally away from the said central section and secured to the longitudinal frame girders, in combination with means for connecting a vehicle end part to the central section of each of said transverse frame girders whereby thrusts emanating within the end parts are transferred to said frame within the region of the central curved section of each of said transverse girders.

3. In a motor vehicle, a frame comprising wheels defining a wheel track, said wheels including a front pair of wheels and a rear pair of wheels, said front and rear pairs of wheels defining a wheel base, two laterally spaced longitudinal frame girders lying outside the wheel track, a front transverse girder bent forwardly and a rear transverse girder bent rearwardly, the apex of the bends of said transverse girders being located within the central longitudinal plane of the vehicle, the apex of the front transverse girder being located within the space between the vertical planes of the front pair of wheels, the apex of the rear transverse girder being located within the space between the vertical planes of the rear pair of wheels, said transverse girders lying inside the wheel base, and all said girders together constituting a substantially hexagonal frame.

4. A motor vehicle according to claim 3 wherein the interior space of the substantially hexagonal frame is free of any further longitudinal or transverse girders.

5. A motor vehicle according to claim 1, wherein the ends of the said transverse girders project through said longitudinal girders and taper in height from the inside to the outside thereof.

References Cited in the file of this patent

UNITED STATES PATENTS

| Number | Name | Date |
|---|---|---|
| 2,107,382 | Maddock | Feb. 8, 1938 |
| 2,143,666 | Swallow | Jan. 10, 1939 |
| 2,173,525 | Wallace | Sept. 19, 1939 |
| 2,228,732 | Rabe | Jan. 14, 1941 |
| 2,344,378 | Wagner | Mar. 14, 1944 |

FOREIGN PATENTS

| Number | Country | Date |
|---|---|---|
| 376,384 | Great Britain | July 14, 1932 |
| 798,153 | France | Mar. 2, 1936 |
| 899,785 | France | Sept. 4, 1944 |